A. P. SCHILLING AND D. J. HASSETT.
RADIUS CUTTER FOR METALS.
APPLICATION FILED FEB. 25, 1920.
1,354,848.
Patented Oct. 5, 1920.
2 SHEETS—SHEET 2.
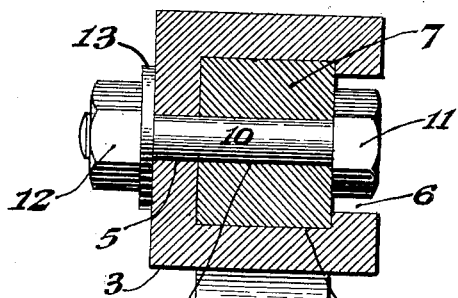
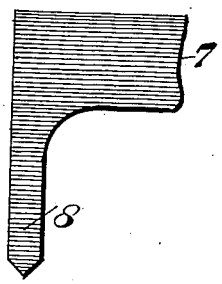
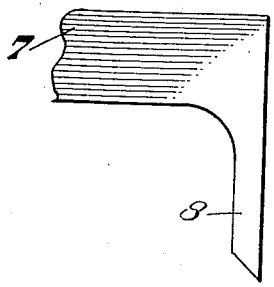
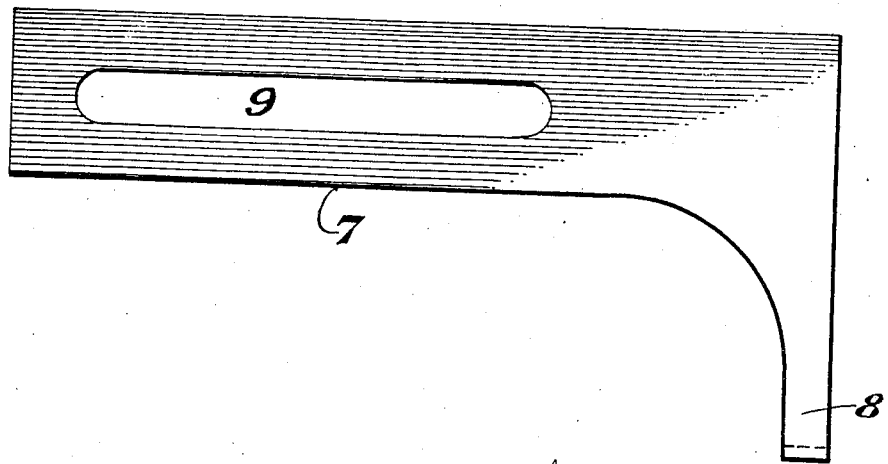
INVENTORS
Adam P. Schilling.
David J. Hassett.
BY Diederhsen + Fairbanks
ATTORNEYS.

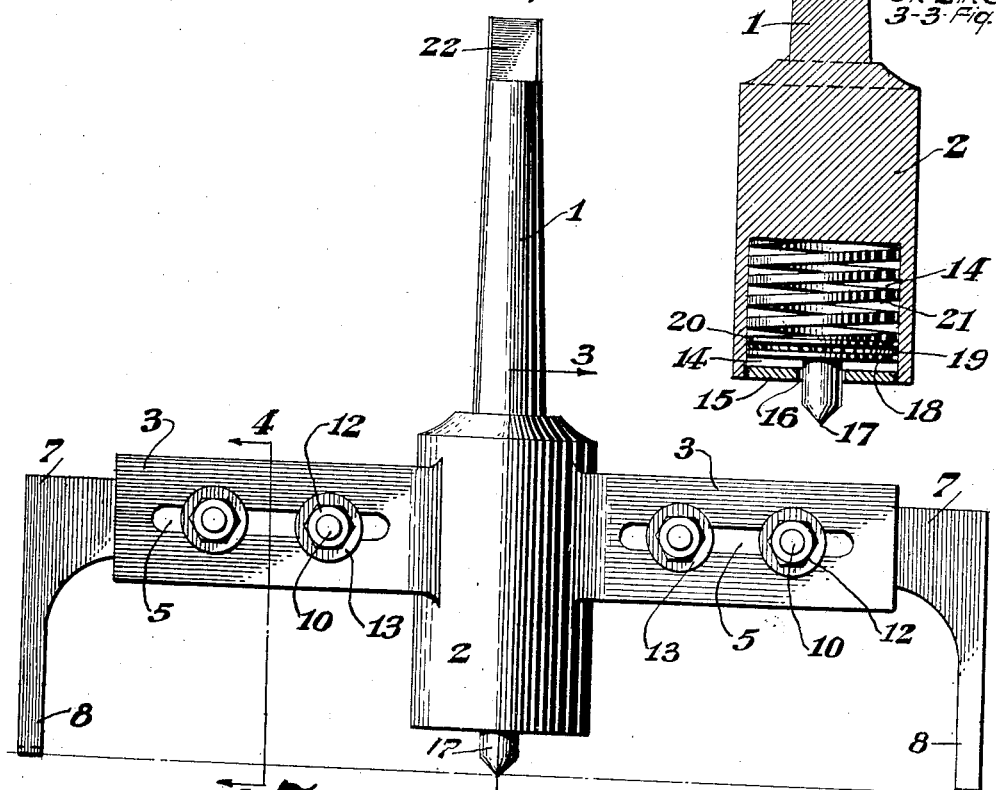
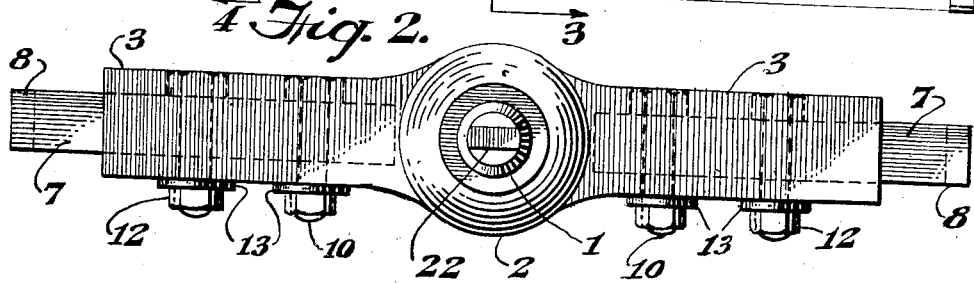

UNITED STATES PATENT OFFICE.

ADAM P. SCHILLING AND DAVID J. HASSETT, OF PHILADELPHIA, PENNSYLVANIA.

RADIUS-CUTTER FOR METALS.

1,354,848.  Specification of Letters Patent.  Patented Oct. 5, 1920.

Application filed February 25, 1920. Serial No. 361,234.

*To all whom it may concern:*

Be it known that we, ADAM P. SCHILLING and DAVID J. HASSETT, citizens of the United States, and residents of the city and county of Philadelphia, in the State of Pennsylvania, have invented a new and useful Radius-Cutter for Metals, of which the following is a specification.

Our invention relates to the class of devices which are employed by being mounted in a lathe or operating machine to cut circular grooves or channels, one or more, in a flat sheet or plate of metal.

The object of the invention is the construction of an efficient, inexpensive and easily adjustable cutting tool which, when mounted in, for instance, the chuck of a lathe or similar device, and in attachment thereto, is rotated, will cut with uniformity and to a desired depth either a single circular cutting or two concentric cuttings or channels, the form of which is determinable by the form of the cutting tool which our invention embodies.

To the foregoing ends our invention comprehends a tool in the organization of which are combined an operating spindle, a tool-carrying head embodying blade holding and containing devices radiating oppositely from said head, and serving as blade receiving devices within sockets on which are contained and adapted to be radially adjusted and retained in desired positions, cutting tools which may or may not be of identical construction so far as their cutting blades are concerned, and one or more of which may be used.

Our invention further comprehends means combined with the tool-carrying head for centering said head and also the cutting tools, and for permitting, without affecting the centering, such downward movement of the head and tool as an entirety as will be correspondent with the depression desired to be exerted upon the tool in the act of causing its cutting blades to fulfil their functions.

Our invention further comprehends details of construction hereinafter explained.

For the purpose of illustrating our invention we have in the accompanying drawings illustrated an embodiment of it which is at present preferred by us because in practice it has given satisfactory and reliable results.

It is to be understood, however, that the elements which our invention comprises are not necessarily confined in general dimensions or proportions to those illustrated in the embodiment, and that we contemplate such modification or alterations as we can mechanically and naturally make without departing from the spirit or scope of the invention or sacrificing any of its advantages.

In the accompanying drawings, Figure 1 represents a side elevation of a cutter embodying our invention.

Fig. 2 represents a top plan view of the cutter illustrated in Fig. 1.

Fig. 3 represents a central, fragmentary section on the line 3—3 of Fig. 1.

Fig. 4 represents a fragmentary section on the line 4—4 of Fig. 1.

Fig. 5 is an enlarged elevation of one of the cutting blades illustrated in, and as removed from, Fig. 1.

Fig. 6 and Fig. 7 represent respectively, in diminished proportions, two typical cutters, the cutting blades of which are of different forms.

Similar numerals of reference indicate corresponding parts.

Referring to the drawings,—1 designates the spindle of our tool, which is preferably tapering as illustrated, and which rises from and is integral or connected with the tool-carrying head 2, which latter is a preferably cylindrical body the axis of which is alined with that of the spindle.

While we have represented this head as externally cylindrical it need not necessarily be of that form.

Extending radially outwardly from opposite sides of the head 2, in the construction shown, are a pair of longitudinally extending, opposite, counter part radial arms 3, which are open at their outer ends, internally chambered or slotted to form blade sockets 4, and either integral with the casting of the head or attached to it.

The blade sockets 4 of these radial arms are shaped to conform to the external configuration of the shanks 7 of the cutting tools, and are upon their sides each longitudinally provided with bolt slots 5 through which the bolts 10 extend.

Upon the sides opposite to those which are slotted these radial arms are longitudinally open to form what we call bolt head openings 6 within which the heads 11 of the bolts 10 lie.

Externally of the bolt slots 5 of the arms 3 extend the threaded ends of the bolts 10, upon which are mounted nuts 12 which preferably bear against washers 13 which lie against the outer faces of the arms 3.

The cutting tools particularly illustrated in Figs. 5, 6 and 7, are preferably composed each of a long body which we term the shank 7 and of a preferably right angularly depending blade 8, the lower or cutting end or point of which possesses the form desired for the purpose of cutting the channels to be cut,—the cutting point being of any form, as, for instance, of any one of the forms illustrated in Figs. 6, 7 and 8, or in fact of any other desired form.

It will be obvious that through the clamping action of the bolts which pass through the slots in the radial arms, each cutting tool may be locked in the desired position lengthwise of the radial arm in which it is inserted.

This, of course makes it possible either to adjust both blades at equal radial distances from the axis of the head, in which event, when the tool is operated the cut will be circular and single; or else to adjust one blade at a different radial distance from the other, in which adjustment, as will be understood, the tool in its rotation will cut two concentric channels.

In order to assure the accurate centering of the tool with relation to the plate that is to be operated upon, we resort to the following construction, the function of which is not only to assure centering but to limit the depth of the cutting.

14 designates a preferably cylindrical chamber within the lower part of the tool-carrying head 2, which is adapted to be closed by a screw cap 15 centrally apertured as at 16, for the passage through it of a centering pin 17 of any desired length, which extends both downwardly and axially of the head below the cap and also up and into the chamber 14 so as to receive upon it what we call a pin disk 18 above which is another disk 20 which we call the spring disk because a spiral spring 21 within the chamber 14 rests upon it, and forms a cushion for said pin.

Between the two disks is conveniently formed a ball-bearing raceway 19, which, as will be obvious, will permit rotary movement of the head and its cap without necessitating rotation of the spring.

The spring itself may be of any preferred character,—we have illustrated a flat plate spring,—and be made of spring wire or its equivalent.

The length of the centering pin is, of course, determinable; and it will be easily understood that when in the operation of the tool the rotary pressure of the latter has caused the blades to cut as deep as may be desired, the bottom of the head may encounter the sheet or plate being cut, and so cause the cessation of any deeper cutting,— all of which is further determinable by the area of the chamber 14, and the compressibility of the spring 7.

Inasmuch as it is our intention to apply our tool to any form of machine or mechanism which will both hold it and occasion its rotation, we form the upper or outer end of the spindle with a square head 22, adapted to be entered into and be held by the chuck of a lathe or by a manually operated device for imparting rotation.

Such being a good form of a radius cutter embodying our invention, its operation has been sufficiently described and will have been understood from our description of the organization of the tool itself.

It will now be apparent that we have devised a novel and useful radius cutter for metals which embodies the features of advantage enumerated as desirable in the statement of the invention and the above description, and while we have, in the present instance, shown and described a preferred embodiment thereof which will give in practice satisfactory and reliable results, it is to be understood that the same is susceptible of modification in various particulars without departing from the spirit or scope of the invention or sacrificing any of its advantages, and it is to be further understood as already mentioned, that when desired but one, or more than two, radially extending blade-carrying arms may be employed, and, further, that the depth of the cavity within the head and the length of the centering pin may be varied to meet differing desired conditions of use, it being evident that a plurality of arms is desirable as they steady the blades on the object being grooved, channeled or cut, centered from the pin 17.

Having thus described our invention what we claim and desire to secure by Letters Patent is:—

1. A cutting tool which comprises in combination,—a rotatable spindle extended to form a tool-carrying head,—a radial arm extending from said head and formed with a blade socket internally terminating at said tool-carrying head, externally open, formed upon one side with a bolt slot extending along its length and upon the opposite side formed with a bolt head opening similarly extending along its length,—a cutter the shank of which is formed with a longitudinal slot corresponding in placement to the bolt slot in the arm, the shank of which lies within said radial arm and the cutting blade of which extends beyond the outer opening of said arm,—and a bolt the head of which lies within the bolt head opening in the radial arm, the shank of which extends through the bolt slot in said arm, and which is provided with a nut external of said radial arm, whereby the shank of the cutter may be adjustably secured with relation to said radial arm, said tool-carrying head and said spindle.

2. A cutting tool which comprises in combination,—a rotatable spindle extended to form a tool-carrying head,—a spring-controlled centering device extending axially below said tool-carrying head,—a radial arm extending from said head and formed with a blade socket internally terminating at said tool-carrying head, externally open, formed upon one side with a bolt slot extending along its length and upon the opposite side formed with a bolt head opening similarly extending along its length,—a cutter the shank of which is formed with a longitudinal slot corresponding in placement to the bolt slot in the arm, the shank of which lies within said radial arm, and the cutting blade of which extends beyond the outer opening of said arm,—and a bolt the head of which lies within the bolt head opening in the radial arm, the shank of which extends through the bolt slot in said arm, and which is provided with a nut external of said radial arm, whereby the shank of the cutter may be adjustably secured with relation to said radial arm, said tool-carrying head and said spindle.

3. A cutting tool which comprises in combination,—a rotatable spindle extended to form a tool-carrying head,—radial arms extending from said head and formed, each, with a blade socket internally terminating at said tool-carrying head, externally open, formed upon one side with a bolt slot extending along its length and upon the opposite side formed with a bolt head similarly extending along its length,—a cutter applied to each radial arm, the shank of each of which is formed with a longitudinal slot corresponding in placement to the bolt slot in its arm, the shank of each of which lies within said radial arm and the cutting blade of each of which extends beyond the outer opening of said arm,—and bolts the head of each of which lies within the bolt head opening in its radial arm, the shank of each of which extends through the bolt slot in said arm, and which are each provided with a nut external of a radial arm, whereby the shank of each cutter may be adjustably secured with relation to the radial arm which contains it, to the tool-carrying head and to the spindle.

4. A cutting tool which comprises in combination,—a rotatable spindle extended to form an enlarged tool carrying head,—a spring-controlled centering device extending axially below said tool-carrying head,—radial arms extending from said head and formed, each, with a blade socket internally terminating at said tool-carrying head, externally open, formed upon one side with a bolt slot extending along its length and upon the opposite side formed with a bolt head similarly extending along its length,—a cutter applied to each radial arm, the shank of each of which is formed with a longitudinal slot corresponding in placement to the bolt slot in its arm, the shank of each of which lies within said radial arm and the cutting blade of each of which extends beyond the outer opening of said arm,—and bolts, the head of each of which lies within the bolt head opening in its radial arm, the shank of which lies within said radial arm and the cutting blade of each of which extends beyond the outer opening of said arm,—and bolts the head of each of which lies within the bolt head opening in its radial arm, the shank of each of which extends through the bolt slot in said arm, and which are each provided with a nut external of a radial arm, whereby the shank of each cutter may be adjustably secured with relation to the radial arm which carries it, to the tool-carrying head and to the spindle.

5. A cutting tool which comprises in combination,—a rotatable spindle,—a head carried by said spindle and axially alined therewith,—a chamber within said head,—a spring within said chamber,—means for retaining said spring within said chamber which embodies a removable cap,—a centering pin extending through said cap and axially alined with said spindle,—a ball-bearing within said chamber and intervening the spring and the centering pin,—arms extending radially from said head,—cutting blades carried by and movable lengthwise with respect to said arms,—and means for adjusting said blades lengthwise of said arms.

ADAM P. SCHILLING.
DAVID J. HASSETT.

Witnesses:
J. BONSALL TAYLOR,
C. D. McVAY.